(12) United States Patent
Puigardeu Aramendia et al.

(10) Patent No.: US 10,486,373 B2
(45) Date of Patent: Nov. 26, 2019

(54) PENETRATION BARRIER FOR ADDITIVE MANUFACTURING

(71) Applicant: HEWLETT-PACKARD DEVELOPMENT COMPANY, L.P., Houston, TX (US)

(72) Inventors: Sergio Puigardeu Aramendia, Barcelona (ES); Alejandro Manuel De Pena, Sant Cugat del Valles (ES); Sebastia Cortes Herms, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 190 days.

(21) Appl. No.: 15/112,074

(22) PCT Filed: Apr. 16, 2014

(86) PCT No.: PCT/US2014/034315
§ 371 (c)(1),
(2) Date: Jul. 15, 2016

(87) PCT Pub. No.: WO2015/108554
PCT Pub. Date: Jul. 23, 2015

(65) Prior Publication Data
US 2016/0325506 A1    Nov. 10, 2016

(30) Foreign Application Priority Data

Jan. 16, 2014   (WO) ............... PCT/EP2014/050841

(51) Int. Cl.
*B33Y 10/00*      (2015.01)
*B29C 64/00*      (2017.01)
(Continued)

(52) U.S. Cl.
CPC .......... *B29C 67/0092* (2013.01); *B29C 64/00* (2017.08); *B29C 64/165* (2017.08);
(Continued)

(58) Field of Classification Search
CPC ............................... B33Y 10/00; B33Y 30/00
See application file for complete search history.

(56) References Cited

U.S. PATENT DOCUMENTS

| 5,204,055 A | 4/1993 | Sachs et al. |
| 6,658,314 B1 | 12/2003 | Gothait |

(Continued)

FOREIGN PATENT DOCUMENTS

| EP | 2199068 B1 | 3/2013 |
| WO | WO-2012058278 A2 | 5/2012 |
| WO | WO-2013174526 A1 | 11/2013 |

OTHER PUBLICATIONS

Ribeiro, F., et al.; 3D Printing With Metals; Feb. 1998; pp. 312-38; vol. 9; Issue 1; http://ieexplore.ieee.org/stamp/stamp.jsp?arnumber=662892.

*Primary Examiner* — Xiao S Zhao

(57) ABSTRACT

In one example, a non-transitory processor readable medium with instructions thereon that when executed cause an additive manufacturing machine to: form a first layer of build material; form a second layer of build material over the first layer; solidify build material in the second layer to form a slice; and form a barrier that is separable from the slice to prevent a coalescing agent in the second layer penetrating build material in the first layer.

16 Claims, 7 Drawing Sheets

(51) Int. Cl.
  *B29C 67/00*   (2017.01)
  *B33Y 30/00*   (2015.01)
  *B33Y 50/02*   (2015.01)
  *B29C 64/165*  (2017.01)
  *B29C 64/386*  (2017.01)
  *B29C 64/40*   (2017.01)
  *B29K 105/00*   (2006.01)

(52) U.S. Cl.
  CPC ............ *B29C 64/386* (2017.08); *B29C 64/40* (2017.08); *B33Y 10/00* (2014.12); *B33Y 30/00* (2014.12); *B33Y 50/02* (2014.12); *B29K 2105/251* (2013.01)

(56) References Cited

U.S. PATENT DOCUMENTS

| | | |
|---|---|---|
| 6,780,368 B2 | 8/2004 | Liu et al. |
| 2004/0183796 A1 | 9/2004 | Velde et al. |
| 2006/0054039 A1* | 3/2006 | Kritchman ............ B29C 64/245 101/424.1 |
| 2007/0241482 A1 | 10/2007 | Giller et al. |
| 2013/0073068 A1 | 3/2013 | Napadensky |
| 2013/0075013 A1 | 3/2013 | Chillscyzn et al. |

\* cited by examiner

PENETRATION BARRIER FOR ADDITIVE MANUFACTURING

BACKGROUND

Additive manufacturing machines produce 3D (three-dimensional) objects by building up layers of material. Some additive manufacturing machines are commonly referred to as "3D printers" because they often use inkjet or other printing technology to apply some of the manufacturing materials. 3D printers and other additive manufacturing machines make it possible to convert a CAD (computer aided design) model or other digital representation of an object directly into the physical object.

DRAWINGS

The same part numbers designate the same or similar parts throughout the figures.

DESCRIPTION

Figure 1:
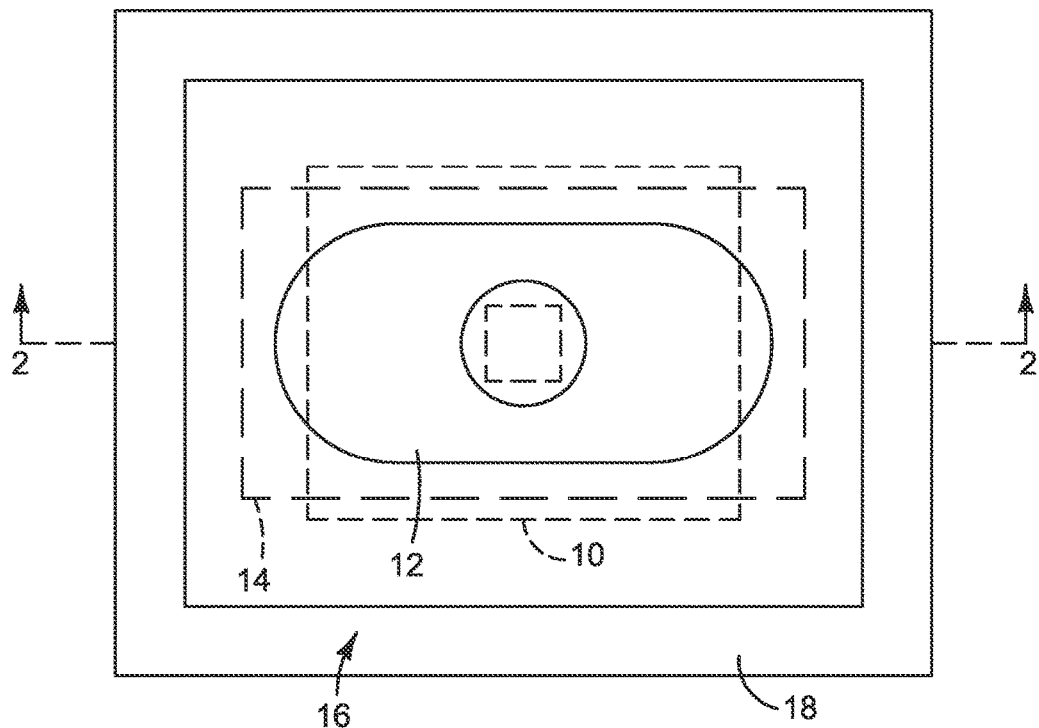
FIGS. 1 and 2 are plan and section views, respectively, illustrating an in-process structure for two objects being manufactured using one example of a new penetration barrier.

Additive manufacturing machines make a 3D object through the solidification of layers of a build material. The properties of the manufactured object is dependent on the type of build material and the solidification mechanism. Additive manufacturing machines make objects based on data in a 3D model of an object created, for example, with a CAD computer program product. The model data is processed into slices each defining that part of a layer or layers of build material to be solidified.

In some additive manufacturing processes that use powdered build materials, the first layers of build material corresponding to the first slices of the object behave differently than subsequent layers because the powder shrinks during solidification, making the solid slice thinner than the layer of powder in which it is formed. Although the thickness of each slice will approach the thickness of the layer of powdered build material after a few layers are processed, the shrink factor can be significant, particularly for thinner parts. For processes that use a liquid coalescing agent, the amount of shrinking increases in proportion to the degree that the liquid penetrates build material in an underlying layer. Thus, to make objects in which a slice or multiple slices are formed on an underlying layer of powder, such as objects with voids or recesses, nested objects and objects formed one over another, it is desirable to control the penetration factor.

A new technique has been developed to help control the penetration factor for additive manufacturing processes that use liquid coalescing agents in powdered build materials. In one example, the manufacturing process includes forming a barrier to coalescing agent in an upper layer of build material penetrating a lower layer, solidifying build material in the upper layer to form a slice of the object, and then separating the slice from the penetration barrier. The barrier can be used to reduce shrinking during solidification and to block solidification energy from reaching underlying build materials and object slices. The barrier can also be used to set a predetermined (known) penetration factor and to change the penetration factor without changing the manufacturing materials. Instructions to form a penetration barrier during the manufacturing process may be implemented, for example, in a CAD computer program product, in an object model processor, or in a controller for the additive manufacturing machine.

While examples are described with reference to additive manufacturing processes that use powdered build materials and liquid coalescing agents, the new technique is not limited to powdered build materials or liquid coalescing agents, but may be implemented with other manufacturing materials. Accordingly, the examples shown in the figures and described herein illustrate but do not limit this disclosure, which is defined in the Claims following this Description.

As used in this document: a "coalescing agent" means a substance that causes or helps cause a build material to coalesce or solidify or to both coalesce and solidify; a "coalescence modifier agent" means a substance that modifies the effect of a coalescing agent; and a "slice" means one or more slices of a multi-slice object or the object itself for a single slice object.

Figure 2:
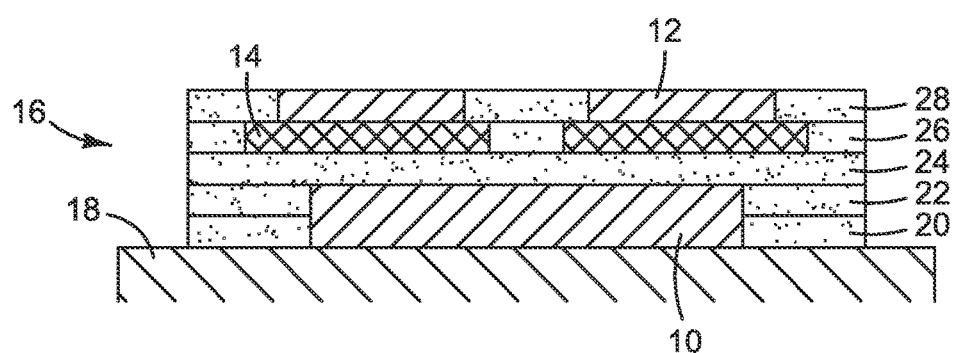
Figure 3:
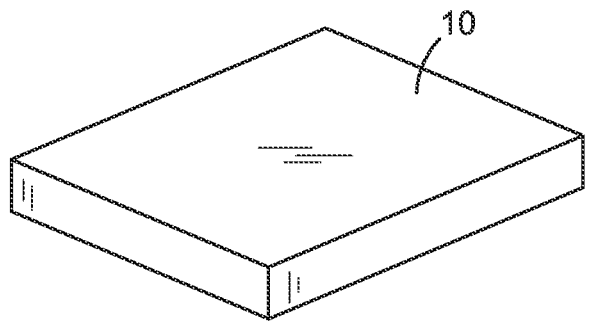
FIGS. 3 and 4 show the finished objects from the in-process structure illustrated in FIGS. 1 and 2.
Figure 4:
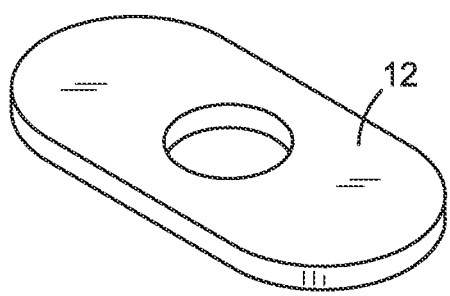

FIGS. 1 and 2 are plan and section views, respectively, illustrating a first object 10 and a second object 12 being manufactured using one example of a penetration barrier 14. The finished objects 10 and 12 are shown in FIGS. 3 and 4. In this example, first object 10 is a two-slice plate and second object 12 is a single-slice ring. Referring to FIGS. 1 and 2, an in-process structure 16 is supported on a platform or other support 18 in an additive manufacturing machine. Structure 16 includes plate 10 formed on platform 18 in the first two layers of build material 20, 22. Any suitable build material may be used, including for example metals, composites, ceramics, glass and polymers, and processed to make the desired solid which may be hard or soft, rigid or flexible, elastic or inelastic. Also, while a powdered build material is depicted in this example, suitable non-powdered build materials could also be used.

In-process structure 16 also includes ring 12 formed on barrier 14 over plate 10. A third layer of build material 24 separates barrier 14 from plate 10. Barrier 14 is formed in the fourth layer of build material 26 and ring 12 is formed in the fifth layer of build material 28. In one example, barrier 14 could be formed directly on second layer 22 including on plate 10. Barrier 14 partially or completely blocks coalescing agent or energy, or both, applied to fifth layer 28 from penetrating into and beyond fourth layer 26 to control shrinking in ring 12 and to inhibit undesired effects on the underlying structures—third layer 24 and object 10 in this example.

The finished parts 10, 12 shown in FIGS. 3 and 4 are obtained by "uncaking" layers of in-process structure 16 to separate the two objects 10, 12 at layer 24, to remove plate 10 from platform 18, and to separate ring 12 from barrier 14. While two very simple objects 10, 12 made with just a few layers of build material are shown to illustrate a penetration barrier 14, a penetration barrier may be used for complex objects manufactured in a single layer or in multiple layers.

Figure 5:
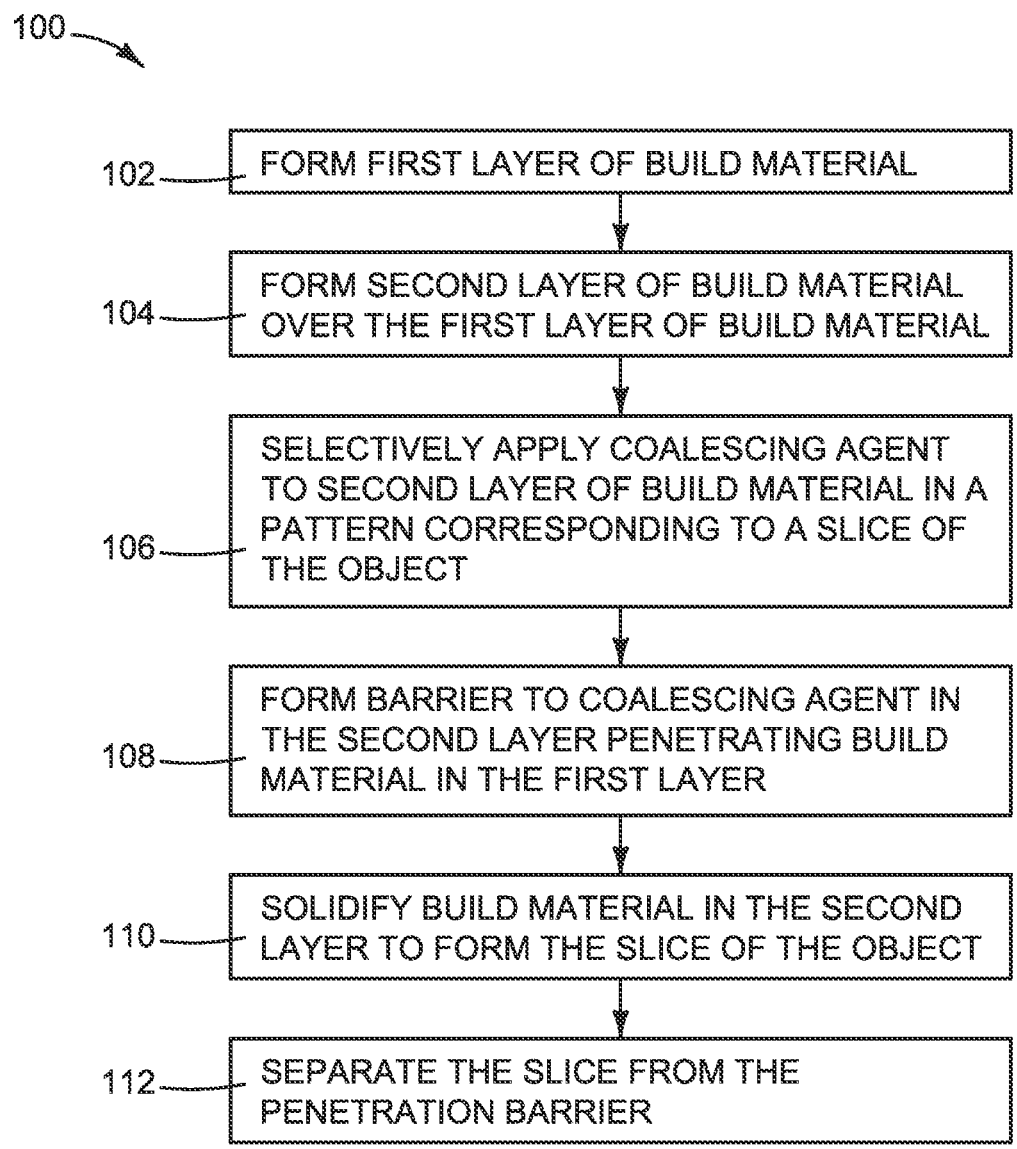
FIG. 5 is a flow diagram illustrating one example of a new additive manufacturing process.
Figure 6:
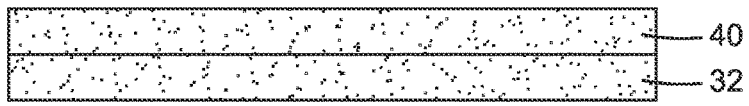
FIGS. 6-12 are cross sections illustrating one example of an object manufactured with the process of FIG. 5.
Figure 9:
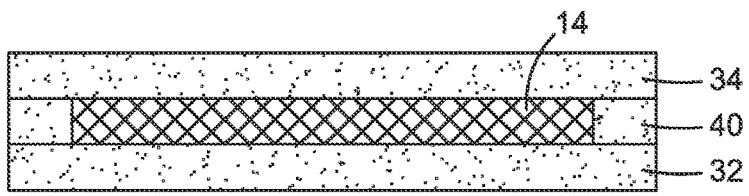

FIG. 5 is a flow diagram illustrating one example of a new additive manufacturing process 100. FIGS. 6-12 are cross sections illustrating one example of an object 30 (FIG. 12) manufactured with the process of FIG. 5. Referring to FIG. 5 and FIGS. 6-12, a first layer of build material 32 is formed (block 102 in FIG. 5) and then a second layer of build material 34 is formed over first layer 32 as shown in FIG. 9 (block 104 in FIG. 5). First layer 32 may be formed, for example, on another manufactured object, on a slice that is to be part of the same manufactured object or on an underlying structure that includes both raw build material and solidified build material.

Figure 10:
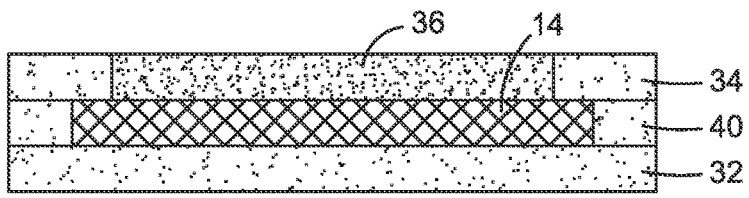

As shown in FIG. 10, a coalescing agent is selectively applied to build material second layer 34 in a pattern corresponding to object 30 (block 106 in FIG. 5). In this example, the coalescing agent defines a region 36 of the build material to be solidified, usually through the application of light or heat energy, or both. Any suitable coalescing agent may be used including, for example, ink or water. A coalescence modifier agent may also be applied to layer 34 to help define the desired shape and characteristics of a slice of the object. A coalescence modifier agent modifies the effect of the coalescing agent and may be dispensed along the edge of the coalescence agent to help reduce the effects of lateral coalescence bleed and improve the definition of the edges of the object. In another example, a modifier agent is dispensed interspersed with the pattern of the coalescing agent to change the material characteristics of the solid object.

Figure 11:
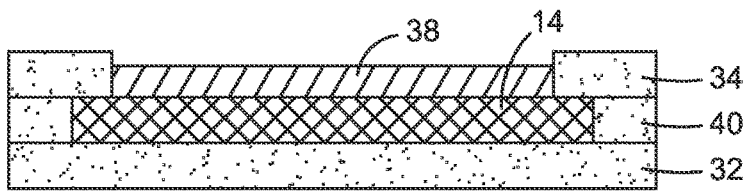
Figure 12:
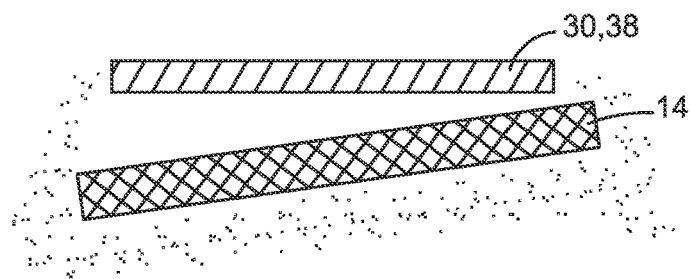

The region 36 of second layer 34 treated with one or both agents is depicted by more dense stippling in FIG. 10. A barrier 14 is formed to block coalescing and modifier agents in second layer 34 from penetrating build material in first layer 32 (block 108 in FIG. 5). Build material in second layer 34 is solidified to form a slice 38 of the object as shown in FIG. 11 (or to form the entire object for a single slice object 30), for example by applying energy to the treated region 36 of layer 34 (block 110 in FIG. 5). Slice 38 is separated from penetration barrier 14, for example after the object is completed (block 112 in FIG. 5). A single slice object 30, 38 separating from barrier 14 is shown in FIG. 12.

Figure 7:
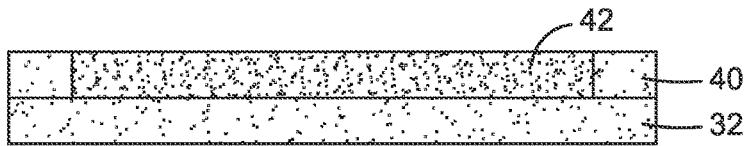
Figure 8:
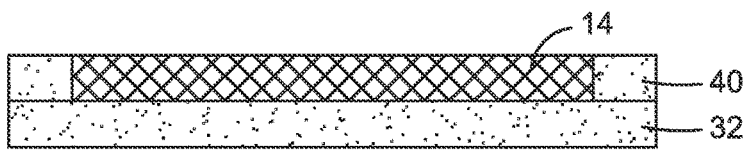

In the example shown, penetration barrier 14 is formed in a third, intervening layer of build material 40 between first layer 32 and second layer 34. A coalescing agent is selectively applied to build material in third layer 40 in a pattern corresponding to the desired penetration barrier as shown in FIG. 7. A coalescence modifier agent may also be selectively applied to layer 40 to help define the desired shape and characteristics of barrier 14. The region 42 of third layer 40 treated with one or both agents is depicted by more dense stippling in FIG. 7. Energy is applied to coalesce or solidify treated region 40 to form penetration barrier 14 shown in FIGS. 8-12.

The combination of build material, coalescing and coalescence modifier agents, and energy may be selected for barrier 14 and slice 38 so that (1) build material with no coalescing agent does not coalesce when the energy is applied, (2) build material with only coalescing agent solidifies when energy is applied; or (3) build material with both agents undergo a modified degree of coalescence between no coalescence and solidification with or without the application of energy. Any suitable modifier agent may be used. For example, some inks and other solutions in which solids are dispersed in a liquid may be used to produce a mechanical separation between particles to inhibit the particles from joining together and solidifying even though they have been treated with a coalescing agent. A coalescence modifier agent may be used to form a thin layer of solids over some of the build material to inhibit solidification or alter the characteristics of the solidified build material. A plasticizer is one example of a coalescence modifier agent that can be used to increase the degree of coalescence. A surface tension modifier may be used as a modifier agent to increase coalescence by increasing the wettability of particles of build material.

Figure 13:
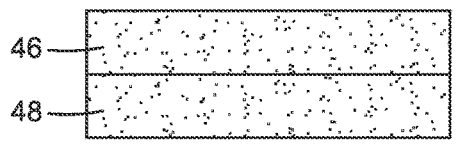
FIGS. 13-16 and 17-19 are cross sections comparing one example of an object slice being manufactured without a penetration barrier (FIGS. 13-16) and with a penetration barrier (FIGS. 17-19).
Figure 17:
Figure 14:
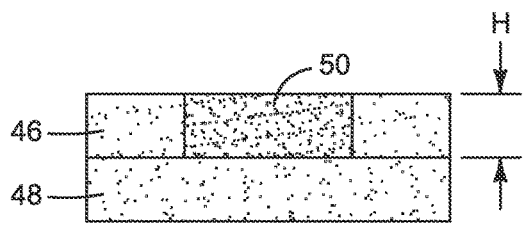
Figure 18:
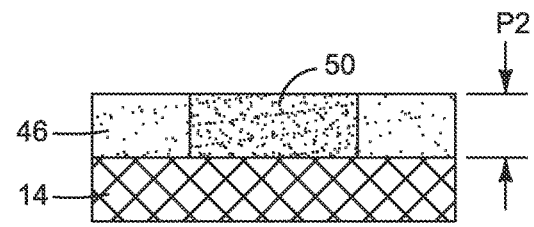
Figure 15:
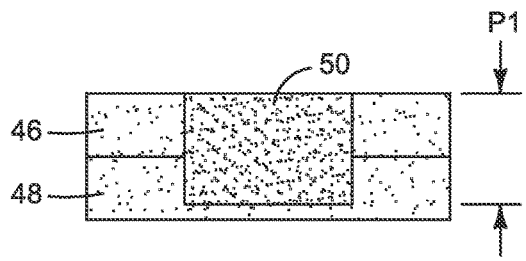
Figure 19:
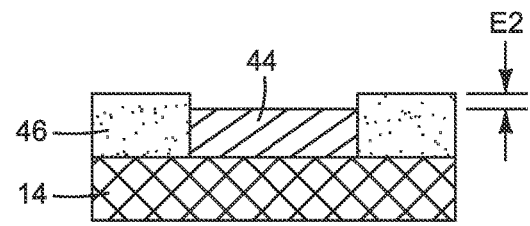

FIGS. 13-16 and 17-19 are cross sections comparing an object slice 44 being manufactured without a penetration barrier (FIGS. 13-16) and with a penetration barrier 14 (FIGS. 17-19). Slice 44 represents a slice anywhere in an in-process structure during manufacture—a first slice, a last slice or a middle slice, or the only slice. In FIG. 13, an upper layer of powdered build material 46 is formed on a lower layer of build material 48. In FIG. 17, upper layer 46 is formed on a penetration barrier 14. When a liquid coalescing agent is applied to upper layer 46 at region 50 in FIGS. 14 and 18, coalescing agent can penetrate through upper layer 46 and into lower layer 48 in the absence of barrier 14, as best seen by comparing FIGS. 14 and 15. The depth of penetration is represented by a penetration factor P. In the example shown, a penetration factor P of 1 represents penetration of coalescing agent into the build material to the thickness of upper layer 46. Thus, P1=1.75 without barrier 14 in FIG. 15 and P2=1 with barrier 14 in FIG. 18, for the same manufacturing materials and conditions.

Figure 16:
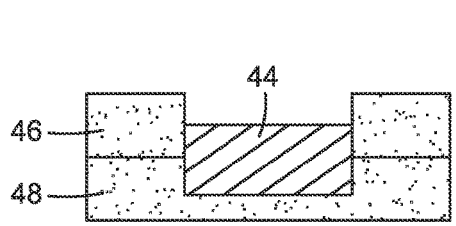

Build material in upper layer 46 is solidified to form slice 44 as shown in FIGS. 16 and 19, for example by applying energy to the treated region 50 of layer 46. The amount of shrink during solidification may be represented by the depth E of the recess 52 in upper layer 46 after solidification, which is calculated according to Equation 1:

$$E = PKH \qquad \text{Equation 1}$$

where K is a shrink factor for the materials and conditions without penetration (K<1), P is the penetration factor for the materials and conditions, and H is the thickness of the layer of build material. The amount of shrink E is proportional to the amount of penetration, represented by penetration factor P. In this example, E2=1 KH with barrier 14 in FIG. 19 and E1=1.75 KH=1.75 E2 without barrier 14 in FIG. 16. That is to say, the amount of shrink is 1.75 times greater in this example without a penetration barrier than with a penetration barrier.

The use of a penetration barrier such as barrier 14 shown in the figures limits the depth of penetration of coalescing and modifier agents without changing the manufacturing materials or the processing parameters used to form the object slices. Limiting penetration can reduce the amount of shrinkage and help control the thickness of the slice to facilitate the manufacture of thinner slices within closer tolerances. Also, the penetration barrier can be formed anywhere in the in-process object structure to control shrinkage in any slice or in any part of a slice.

Control data to form a penetration barrier or multiple penetration barriers can be generated, for example, by processor readable instructions on the source application, usually a CAD computer program product, in an object model processor, or by processor readable instructions on the additive manufacturing machine. Although the penetration barrier(s) can be formed with the same materials and processes used to make a slice, some differentiation usually will be desired to facilitate separating the barrier from the object. Thus, for example, the properties of the barrier may be differentiated from the object by varying the application of coalescing agent or coalescence modifier agent, or both, by not solidifying the barrier, or by forming the barrier layer with a default ink to create a typically thin waste layer that is readily separated from the object.

Figure 20:
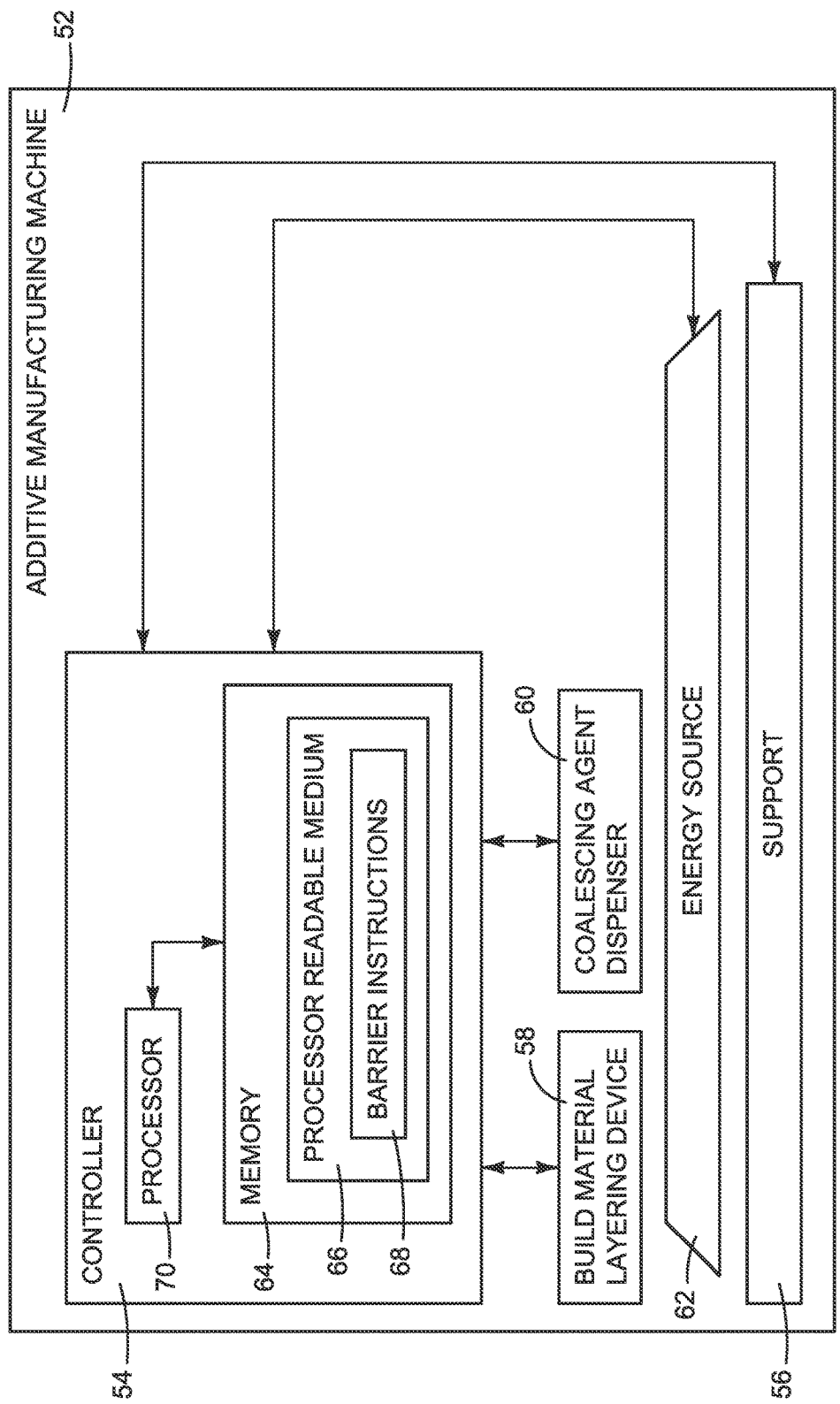
FIG. 20 is a block diagram illustrating one example of an additive manufacturing machine implementing a controller with instructions to form a penetration barrier during the manufacture of a 3D object.

FIG. 20 is a block diagram illustrating one example of an additive manufacturing machine 52 implementing a controller 54 with instructions to form a penetration barrier during the manufacture of a 3D object. Referring to FIG. 20, machine 52 includes controller 54, a support 56, a build material layering device 58, a coalescing agent dispenser 60, and an energy source 62. The in-process structure is supported on support 56 during manufacturing. In some machines 52, support 56 may support the in-process structure during uncaking. Also, in some machines 52, support 56 is movable at the urging of controller 54 to compensate for the changing thickness of the in-process structure, for example as layers of build material are added during manufacturing.

Build material layering device 58 layers build material on support 56 and on the in-process structures and may include, for example, a device to dispense the build material and a blade or roller to distribute the build material uniformly to the desired thickness for each layer. Coalescing agent dispenser 60 dispenses coalescing agent selectively at the direction of controller 54 on to build material, usually in a pattern corresponding to a slice. While any suitable dispenser may be used, inkjet printheads are often used in additive manufacturing machines because of the precision with which they can dispense agents and their flexibility to dispense different types and formulations of agents. Energy source 62 applies energy at the direction of controller 54 to solidify build material treated with coalescing agent. Energy source 62 may be implemented as an unfocused source in which energy is applied simultaneously to the whole layer of build material or as a focused source such as a laser beam that applies energy selectively to portions of the layer of build material. While it is expected that energy source 62 usually will be implemented as a light source, other suitable energy sources are possible.

Controller 54 represents the processor (or multiple processors), the associated memory (or multiple memories) and instructions, and the electronic circuitry and components needed to control the operative elements of machine 52. In particular, controller 54 includes a memory 64 having a processor readable medium 66 with instructions 68 to form a penetration barrier, such as a barrier 14 described above, and a processor 70 to read and execute instructions 68. For example, controller 54 would receive instructions from a CAD program to make an object (e.g., steps 102, 104, 106 and 110 in FIG. 5) and then execute instructions 68 to form a penetration barrier (e.g., step 108 in FIG. 5) as part of the process of making the object.

Figure 21:
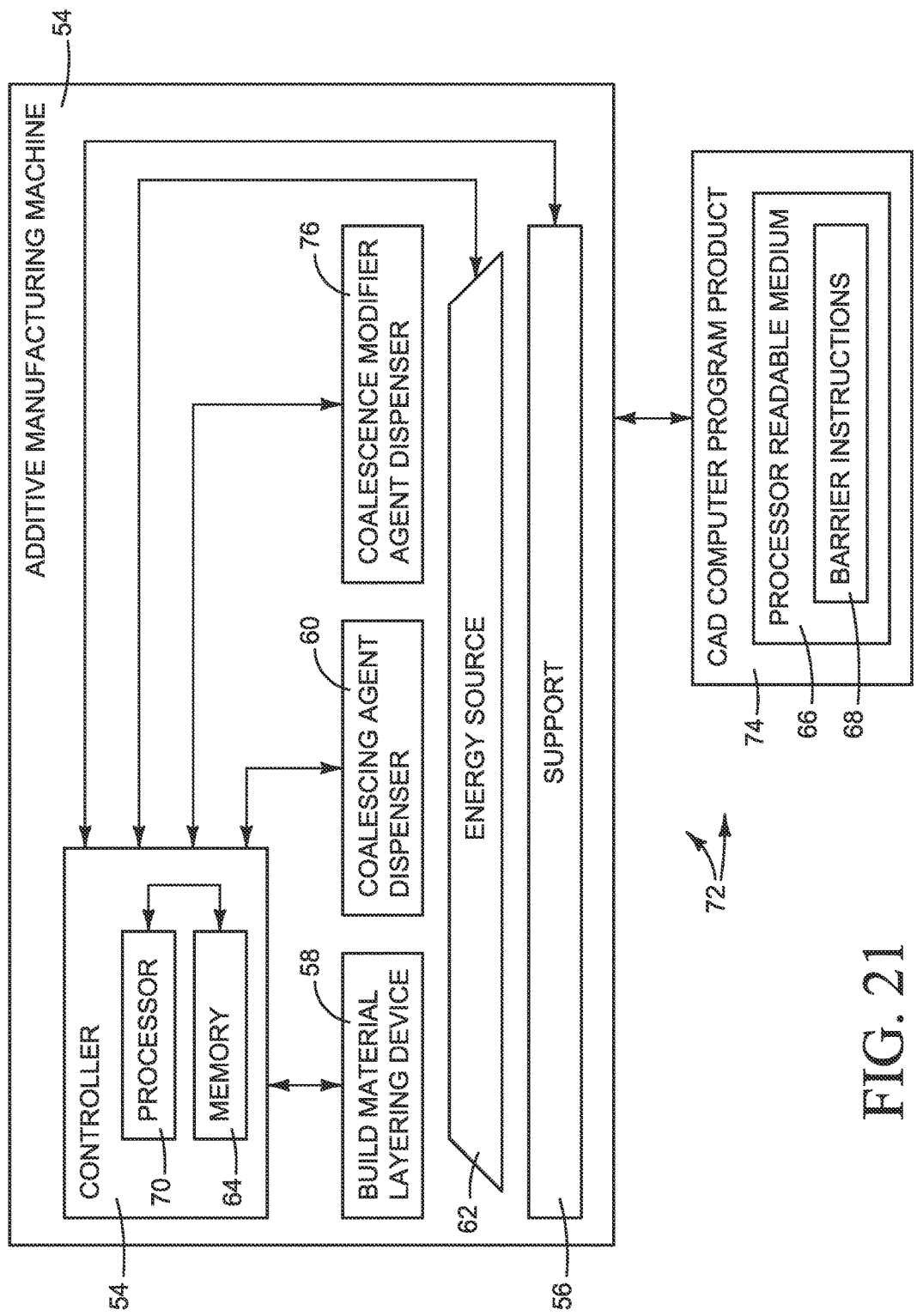
FIG. 21 is a block diagram illustrating one example of an additive manufacturing system implementing a CAD computer program product with instructions to form a penetration barrier during the manufacture of a 3D object.

Alternatively, barrier instructions 68 may be embodied in a processor readable medium 66 separate from controller 54, for example as part of a CAD computer program product shown in FIG. 21. Referring to FIG. 21, an additive manufacturing system 72 includes an additive manufacturing machine 52 operatively connected to a CAD computer program product 74 with the instructions to form the penetration barrier(s) during the manufacture of the object. In this example, CAD program 74 includes a processor readable medium 66 with barrier instructions 68. Any suitable connection between machine 52 and CAD program 74 may be used to communicate instructions to machine 52 including, for example, a wired link, a wireless link, and a portable connection such as a flash drive or compact disk. Also, in this example, additive manufacturing machine 52 includes a coalescence modifier agent dispenser 76. Inkjet printheads or another suitable dispenser 76 dispenses coalescence modifier agent selectively on to build material at the direction of controller 54 executing instructions from CAD program 74.

"A" and "an" used in the claims means one or more.

As noted at the beginning of this Description, the examples shown in the figures and described above illustrate but do not limit the disclosure. Other examples are possible. Therefore, the foregoing description should not be construed to limit the scope of the disclosure, which is defined in the following claims.

What is claimed is:

1. A non-transitory processor readable medium having instructions thereon that when executed cause an additive manufacturing machine to:
   form a first layer of build material;
   form a second layer of build material over the first layer;
   selectively add a coalescing agent to the second layer;
   solidify build material in the second layer to form a slice; and
   before the second layer of build material is formed, form a barrier, using the build material of the first layer, that is separable from the slice, such that the coalescing agent applied to the second layer is prevented from penetrating into the build material in the first layer.

2. The medium of claim 1, wherein:
   the instructions to form a barrier include instructions to form the barrier in the first layer of build material; and
   the instructions to form a second layer of build material over the first layer include instructions to form the second layer of build material on the first layer of build material.

3. The medium of claim 2, further comprising instructions to form the first layer of build material on a third layer of build material.

4. The medium of claim 2, wherein the instructions to form the barrier in the first layer of build material include instructions to coalesce build material in the first layer or to solidify build material in the first layer or to coalesce and solidify build material in the first layer.

5. A computer program product that includes the non-transitory processor readable medium of claim 1.

6. A process for making a three dimensional object, comprising:
   forming a first layer of build material;
   forming a second layer of build material over the first layer;
   adding coalescing agent to the second layer;
   before the second layer of build materials is formed, forming a barrier using the build material of the first layer to prevent the coalescing agent in the second layer from penetrating into the build material in the first layer;
   solidifying build material in the second layer to form a slice of the object; and
   separating the slice from the barrier.

7. The process of claim 6, wherein solidifying build material in the second layer includes solidifying build material in the second layer on the barrier.

8. The process of claim 7, wherein solidifying build material on the barrier includes:

dispensing a coalescing agent onto build material of the second layer, which is disposed on the barrier, in a pattern to form patterned build material; and applying energy to the patterned build material.

9. The process of claim 7, wherein solidifying build material on the barrier comprises:

dispensing a coalescing agent onto build material of the second layer, which is disposed on the barrier, in a first pattern to form a first patterned build material;

dispensing a coalescence modifier agent onto build material of the second layer, which is disposed on the barrier, in a second pattern to form a second patterned build material;

applying energy to the first patterned build material and the second patterned build material.

10. The process of claim 6, further comprising, with the barrier, blocking applied energy from penetrating into the first layer.

11. The process of claim 6, further comprising applying a different combination of coalescing agent, coalescence modifier agent and energy to form the barrier as are applied to form the slice of the object.

12. The process of claim 6, further comprising, with the barrier, limiting shrinkage of the slice of the object.

13. A process for making a three dimensional object, comprising:

forming a first layer of build material;

forming a barrier from the build material of the first layer to prevent coalescing agent in second layer from penetrating into the build material in the first layer;

forming the second layer of build material over the first layer;

adding coalescing agent to the second layer;

solidifying build material in the second layer to form a slice of the object; and separating the slice from the barrier;

wherein forming the barrier includes coalescing build material in the first layer or solidifying build material in the first layer or coalescing and solidifying build material in the first layer.

14. The process of claim 13, further comprising, with the barrier, blocking applied energy from penetrating into the first layer.

15. The process of claim 13, further comprising applying a different combination of coalescing agent, coalescence modifier agent and energy to form the barrier as are applied to form the slice of the object.

16. The process of claim 13, further comprising, with the barrier, limiting shrinkage of the slice of the object.

* * * * *

UNITED STATES PATENT AND TRADEMARK OFFICE
CERTIFICATE OF CORRECTION

PATENT NO. : 10,486,373 B2
APPLICATION NO. : 15/112074
DATED : November 26, 2019
INVENTOR(S) : Sergio Puigardeu Aramendia et al.

Page 1 of 1

It is certified that error appears in the above-identified patent and that said Letters Patent is hereby corrected as shown below:

In the Claims

In Column 6, Line 25, Claim 1, delete "solidify" and insert -- solidifying --, therefor.

Signed and Sealed this
Eighteenth Day of February, 2020

Andrei Iancu
*Director of the United States Patent and Trademark Office*